July 28, 1953     LE ROY M. KUBAUGH     2,646,677
MEANS FOR SEALING CONTAINERS FOR PRESSURE TESTING
Filed Feb. 4, 1948
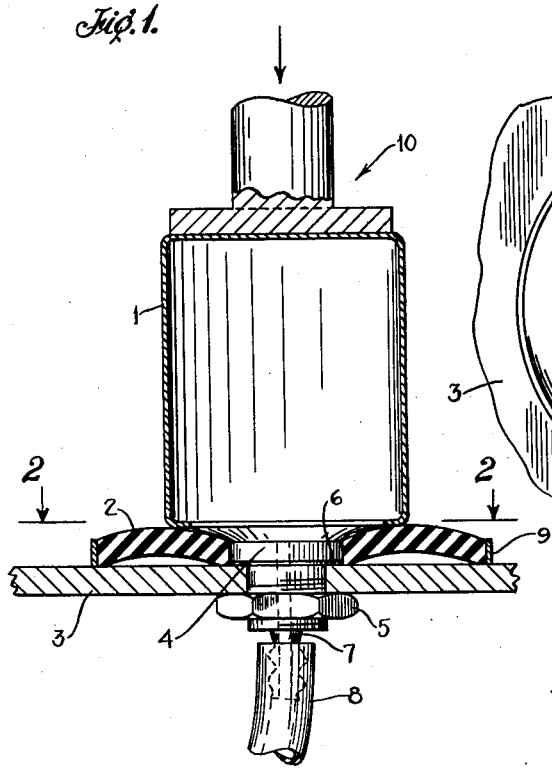
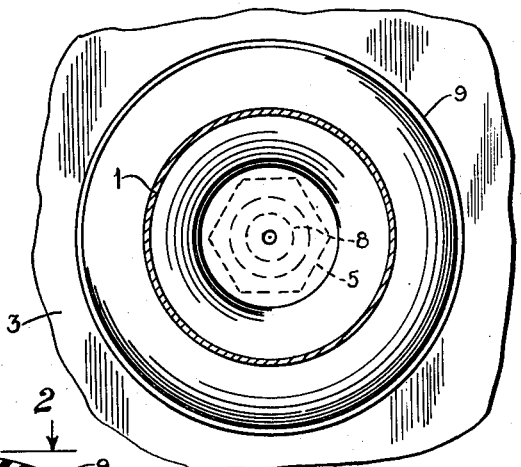
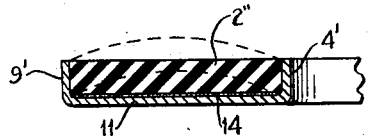
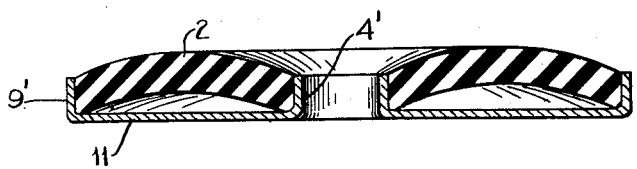
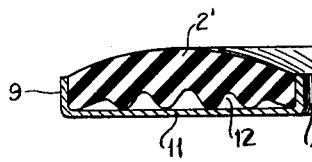
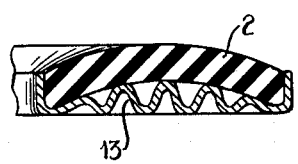
INVENTOR.
LEROY M. KUBAUGH
BY
Ely & Frye
ATTYS.

Patented July 28, 1953

2,646,677

UNITED STATES PATENT OFFICE

2,646,677

MEANS FOR SEALING CONTAINERS FOR PRESSURE TESTING

Le Roy M. Kubaugh, Akron, Ohio, assignor to The Firestone Tire & Rubber Company, Akron, Ohio, a corporation of Ohio Application February 4, 1948, Serial No. 6,175

8 Claims. (Cl. 73—40)

This invention relates to a seal for testing the air-tightness of containers, such as tin cans or the like.

In the manufacture of cans it has been customary to test cans by placing the open end thereof on a resilient pad while pressing the edges of the can down into the pad. Air under pressure is then introduced into the can through an opening in the pad and appropriate means are provided for detecting leaks as evidenced by a fall of pressure. The rubber pad serves as a gasket to avoid false leak indications.

It has been found that such pads deteriorate rapidly in service due to cutting action of the can under the pressure required.

In the present invention advantage is taken of the fact that rubber-like materials are more resistant to cutting action when under compression. That is to say, the pads are so formed that initial contact by the can serves to place the contacted region of the pad under compression. Thereafter, increasing pressures of the can on the pad are resisted by a material under compressive stress.

It is therefore an object of the invention to increase the life of seals used in the testing of containers for air-tightness.

It is a further object to increase the life of seals for testing containers by providing an inherent compressive stress in the seal prior to full application of container pressure.

More particularly, it is an object to provide a seal for testing containers which seal has a curved section transverse to the direction of application of the container.

To these and other ends reference is had to the accompanying specification and to the drawing, wherein:

Fig. 1 is an axial section of a test can and testing apparatus;

Fig. 2 is a bottom plan view thereof, with the air hose removed;

Fig. 3 is a diametral section of a test pad and holder; and

Figs. 4, 5 and 6 are fragmentary views similar to Fig. 3 and showing modifications.

Referring to the drawings by characters of reference, there is shown, in Fig. 1, a can 1 closed except on one end. The open end of the can is received on an annular or washer-like pad 2 which is carried by a conveyor 3 which, conventionally, is a circular table. A headed conduit 4 held in an opening through the table 3 and fixed with a lock-nut 5 is sealed air-tight by a gasket washer 6 and has a reduced nipple 7 for ready attachment of an air-hose 8. A ring member 9 carried by the table 3 forms an outer limit for the pad 2. A pressure member 10 which may be stationary or a part of the conveyor serves to press the can 1 down into air-tightness with the pad 2 sufficiently to resist relatively high pressures.

All elements described except the pad 2 and its relation to elements 4 and 9 are conventional and form no part of the present invention. In similar devices heretofore used the pad 2 has been a flat washer in its natural unstressed state and was attached to the table in any convenient manner.

As shown in Fig. 1, the pad 2, in its unstressed state has an upwardly curved form in diametral section. Therefore, as in arch flexure, a pressure downward causes a state of compression throughout the pad, the outer periphery being restrained. The extreme difference in cutting properties of rubber-like materials when in tension and when in compression is quite pronounced, as may be verified by simple tests, and the resistance to cutting when in compression as compared with that in a neutral state of stress also shows considerable improvement. Therefore, a pad as shown which assumes a state of compression as it is depressed by the test container is able to withstand the abuse of concentrated stresses imparted by container rims in a manner much more satisfactory than has been apparent with the prior art pads.

In further reference to the Fig. 1 modification, it should be noted that whereas the provision of outer ring 9 is preferred, the invention may be practiced without such an outer limit. In such a case the pad will flex without total compression, the bottom partaking of a tensile stress but there will nevertheless be a compressive stress in the upper layers.

In Fig. 3 is shown a modification wherein the pad 2 is contained within a housing 11 of annular channel form, of which the outer flange 9' performs the function of the ring 9 and the inner flange 4' serves as an abutment similar to the conduit 4. This form offers a convenience in that the housing or pad need not be rigidly fixed to the conveyor 3 but merely inserted over the conduit 4, the natural resiliency of the arched pad serving to loosen any sticking engagement between the container rim and the pad.

In Figs. 4 and 5 are shown modifications wherein the compressive effect is enhanced and the pads are adapted to different sized containers. Thus, in Fig. 4 the pad 2' is shown as having a circularly corrugated bottom. A can rim pressed toward any one of these troughs, such as 12 for instance will result in a very high localized region of compression in the top layer above and roughly coextensive with the trough. In Fig. 5, the housing has a corrugated bottom and the same result is achieved by deformation of a narrow band of rubber into a trough of the bottom, such as 13.

In Fig. 6 is shown a pad 2" which is in a state of compression retained in the bottom of the housing 11 by a film of cement 14, and which pad has an arched form in the unstressed state as shown in dotted lines.

It will thus be seen that the invention comprises the testing of containers wherein the sealing pad, in its final, pressure-sealing condition is in a state of compression along the line of sealing. As demonstrated herein this can be accomplished in various ways and in various degrees, and the state of compression can be induced coincident with the act of joining container and seal or prior thereto. I therefore desire that my invention be interpreted in its broadest aspects, as defined by the spirit and scope of the appended claims.

What is claimed is:

1. In combination, a support for testing open-ended containers, a sealing paid of rubber-like resilience on said support, and pressure means for urging the open end of said container into sealing engagement with the pad, said pad having a concave under surface spaced in part from said support when in normal unstressed condition, whereby a state of compressive stress is engendered in said pad when urged downwardly toward said support by said pressure means acting through said container.

2. In combination, a support for testing open-ended containers, a sealing pad of rubber-like resilience on said support, pressure means for urging the open end of said container into sealing engagement with the pad, said pad having a concave under surface spaced in part from said support when in normal unstressed condition, whereby a state of compressive stress is engendered in said pad when urged downwardly toward said support by said pressure means acting through said container, and means surrounding said pad and limiting outward motion of the pad transverse to the direction of applied pressure.

3. In combination, a support for testing open-ended containers, an annular sealing pad of rubber-like resilience on said support, said pad having an arched form in radial cross-section, and pressure means for urging the open end of said container into sealing engagement with the pad, said pad adapted to deform, when subjected to the pressure of said means, into a condition of compressive stress.

4. In combination, a support for testing open-ended containers, an annular sealing pad of rubber-like resilience on said support, said pad having an arched form in radial cross-section, a ring-shaped member surrounding said pad so as to limit outward movement of the periphery thereof, and pressure means for urging the open end of said container into sealing engagement with the pad, said pad adapted to deform, when subjected to the pressure of said means, into a condition of compressive stress.

5. In combination, a support for testing open-ended containers, an annular sealing pad of rubber-like resilience on said support, said pad having an arched form in radial cross-section, an annulus of channel section housing said pad, and pressure means for urging the open end of said container into sealing engagement with the pad, said pad adapted to deform, when subjected to the pressure of said means, into a condition of compressive stress.

6. In combination, a support for testing open-ended containers, an annular sealing pad of rubber-like resilience on said support, said pad having an arched form in radial cross-section, an annulus of channel section housing said pad, said annulus having corrugations in its bottom concentric with its axis, and pressure means for urging the open end of said container into sealing engagement with the pad, said pad adapted to deform, when subjected to the pressure of said means, into a condition of compressive stress.

7. In combination, a support for testing open-ended containers, a sealing pad of rubber-like resilience on said support, and pressure means for urging the open end of said container into sealing engagement with the pad, said pad having an arched upper surface and a corrugated lower surface when in normal, unstressed condition, whereby a state of compressive stress is engendered in said pad when urged downwardly toward said support by said pressure means acting through said container.

8. In combination, a support for testing open-ended containers, a sealing pad of rubber-like resilience on said support and pressure means for urging the open end of said container into sealing engagement with the pad, said pad having an arched upper surface and a corrugated lower surface when in normal, unstressed condition, whereby a state of compressive stress is engendered in said pad when urged downwardly toward said support by said pressure means acting through said container, and an annulus of channel section housing said pad.

LE ROY M. KUBAUGH.

References Cited in the file of this patent

UNITED STATES PATENTS

| Number | Name | Date |
| --- | --- | --- |
| 715,324 | Wachhorst et al. | Dec. 9, 1902 |
| 1,118,478 | Dixon | Nov. 24, 1914 |
| 1,606,486 | Stevens | Nov. 9, 1926 |
| 1,814,283 | Braner | July 14, 1931 |
| 2,086,116 | Burns | July 6, 1937 |
| 2,345,387 | Elsey | Mar. 28, 1944 |
| 2,398,328 | Rogers | Apr. 9, 1946 |
| 2,445,410 | Smith | July 20, 1948 |

OTHER REFERENCES

Publication "Goetz Gasket Chart" Goetz Gasket and Packing Co., New Brunswick, N. J. published 1944.